US012726027B2

(12) United States Patent
Zhang et al.

(10) Patent No.: US 12,726,027 B2
(45) Date of Patent: Sep. 1, 2026

(54) SYNCHRONIZATION CONTROL METHOD AND SYSTEM FOR MICROGRID GROUP

(71) Applicant: BEIJING GOLDWIND CARBON NEUTRAL ENERGY CO., LTD., Beijing (CN)

(72) Inventors: Wei Zhang, Beijing (CN); Dehua Zheng, Beijing (CN); Fuhao Gou, Beijing (CN); Suxian Xie, Beijing (CN); Junsheng Zhang, Beijing (CN); Xun Zhang, Beijing (CN); Bitew Girmaw Teshager, Beijing (CN); Shuzhong Zhu, Beijing (CN); Yonghuan Chen, Beijing (CN)

(73) Assignee: BEIJING GOLDWIND CARBON NEUTRAL ENERGY CO., LTD., Beijing (CN)

(*) Notice: Subject to any disclaimer, the term of this patent is extended or adjusted under 35 U.S.C. 154(b) by 402 days.

(21) Appl. No.: 18/558,092

(22) PCT Filed: Sep. 28, 2021

(86) PCT No.: PCT/CN2021/121412
§ 371 (c)(1),
(2) Date: Oct. 30, 2023

(87) PCT Pub. No.: WO2022/227401
PCT Pub. Date: Nov. 3, 2022

(65) Prior Publication Data

US 2024/0222973 A1 Jul. 4, 2024

(30) Foreign Application Priority Data

Apr. 30, 2021 (CN) ........................ 202110483285.9

(51) Int. Cl.
*H02J 3/08* (2026.01)
*H02J 3/38* (2006.01)
*H02J 3/388* (2026.01)

(52) U.S. Cl.
CPC ................ *H02J 3/08* (2013.01); *H02J 3/381* (2013.01); *H02J 3/388* (2020.01)

(58) Field of Classification Search
USPC .......................................................... 700/297
See application file for complete search history.

(56) References Cited

U.S. PATENT DOCUMENTS 11,451,065 B1* 9/2022 Worku ................. G05B 19/042
2012/0259477 A1* 10/2012 Abido ....................... H02J 3/38 700/297

(Continued)

FOREIGN PATENT DOCUMENTS

CN 102510124 A 6/2012
CN 103280842 A 9/2013

(Continued)

OTHER PUBLICATIONS

KR_20120059868_A (Year: 2012).*

(Continued)

*Primary Examiner* — Hien D Khuu

(57) ABSTRACT

The present disclosure provides a synchronization control method and system for a microgrid group. The synchronization control system for a microgrid group includes a central controller, and the central controller is configured to: receive a voltage measurement value at a grid connection point from each of the plurality of microgrids; perform proportional-integral adjustment on the voltage measurement value to obtain a difference between the voltage measurement value at a previous moment and a control value at a current moment, so as to estimate a control instruction at a next moment for each microgrid; and send a (Continued)

control instruction to at least one microgrid of the plurality of microgrids, to adjust closing synchronization between the plurality of microgrids through phase lock control. The accuracy and timeliness of the collected data and the effectiveness of the control can be ensured, which greatly improves a success rate of synchronization closing.

18 Claims, 15 Drawing Sheets

(56) References Cited

U.S. PATENT DOCUMENTS

| | | | | |
|---|---|---|---|---|
| 2013/0051103 | A1 | 2/2013 | Roscoe et al. | |
| 2013/0155735 | A1* | 6/2013 | Ilic | H02J 3/381 363/71 |
| 2015/0270712 | A1 | 9/2015 | Kanayama et al. | |
| 2016/0266559 | A1 | 9/2016 | Shi et al. | |
| 2017/0179720 | A1* | 6/2017 | Porter | H02J 3/16 |
| 2017/0179722 | A1* | 6/2017 | Porter | H02J 3/32 |
| 2017/0214248 | A1* | 7/2017 | Rowe | H02J 3/16 |
| 2017/0288561 | A1* | 10/2017 | Lemberg | H02M 7/539 |
| 2018/0034317 | A1 | 2/2018 | Khatib et al. | |
| 2019/0148941 | A1* | 5/2019 | Wang | G05B 15/02 700/287 |
| 2021/0367429 | A1* | 11/2021 | Anichkov | H02J 3/06 |

FOREIGN PATENT DOCUMENTS

| | | | |
|---|---|---|---|
| CN | 103529817 | A | 1/2014 |
| CN | 103795087 | A | 5/2014 |
| CN | 105162169 | A | 12/2015 |
| CN | 106026188 | A | 10/2016 |
| CN | 106026195 | A | 10/2016 |
| CN | 107017661 | A | 8/2017 |
| CN | 207853486 | U | 9/2018 |
| CN | 109088439 | A | 12/2018 |
| CN | 110768261 | A | 2/2020 |
| CN | 110867848 | A | 3/2020 |
| CN | 111049200 | A | 4/2020 |
| CN | 112688328 | A | 4/2021 |
| CN | 113300408 | A | 8/2021 |
| EP | 3 312 971 | A1 | 4/2018 |

OTHER PUBLICATIONS

Danzi et al. "Distributed_proportional-fairness_control_in_microgrids_via_blockchain_smart_contracts", IEEE, 2017, p. 45-51. (Year: 2017).*

CN_109088439_A (Year: 2018).*

WO_2018168028_A1 (Year: 2018).*

CN_105576707_A (Year: 2016).*

CN_108923435_A (Year: 2018).*

Australian Notice of Acceptance of Patent Application dated Dec. 12, 2024; Appln. No. 2021443821.

The Extended European Search Report; Appln. No. 21938864.2 dated Apr. 30, 2025.

The First Chinese Office Action dated May 11, 2023; Appln. No. 202110483285.9 (No English Translation only Concise Explanation of Relevance for CN-OA1).

The International Search Report mailed Jan. 20, 2022; PCT/CN2021/121412.

* cited by examiner

SYNCHRONIZATION CONTROL METHOD AND SYSTEM FOR MICROGRID GROUP

CROSS-REFERENCE TO RELATED APPLICATION

The present application is a National Stage of International Application No. PCT/CN2021/121412 filed on Sep. 28, 2021, which claims priority to Chinese Patent Application No. 202110483285.9 filed on Apr. 30, 2021, both of which are incorporated herein by reference in their entireties.

TECHNICAL FIELD

The present disclosure relates to the technical field of microgrid group control, and in particular to a synchronization control method and system for a microgrid group based on optimal state estimation and an IEC 61850 communication method.

BACKGROUND

With the development and maturity of larger-capacity microgrid systems, multiple microgrids have developed from a single grid connection point to multiple grid connection points. Multiple loads in a same industrial park require the construction of multiple microgrids. Parallel operation among multiple microgrids can maximize the use of energy, improve system stability, and ensure power supply reliability. The traditional grid connection closing synchronization technology is a technology based on the parallel operation of multiple machines in the power system. When solving the problem of closing synchronization, a quasi-synchronization parallel device installed at a synchronization parallel point in a hub substation is mainly used to determine a voltage amplitude difference, a phase difference and a frequency difference, and then calculate a synchronization parallel leading time to control a closing relay, so as to achieve the purpose of parallel operation. However, the traditional synchronization closing control technology is mainly aimed at a large grid system where the power supply frequency is basically unadjustable. It is not suitable for a microgrid with more flexible power supplies and containing a large number of power electronic devices, and also has shortcomings such as long time consumption and complex calculation in data processing, information communication, control algorithms, etc.

In an alternating current (AC) microgrid, distributed power generation equipment is mainly connected through a synchronization power generator or an interface of a power electronic device (a converter). A synchronization power generator type of power supply is similar to a function of synchronization detection and reclosing of a traditional protection device. Since the power generator itself has rotational inertia and damping so that a frequency of voltage does not suddenly change during stable operation, its grid connection can be achieved by using the synchronization detection device, that is, under a condition that an amplitude, a frequency, a phase angle of a power supply side voltage and a grid side voltage reach an allowable range of grid connection, it can be closed and connected to the grid. A distributed power supply and energy storage device interfaced by a power electronic device is similar to an automatic quasi-synchronization parallel operation of a traditional grid, synchronization grid connection is mainly based on a phase locking technology of a stable voltage source, and uses voltage control to achieve pre-synchronization control of microgrid system grid connection. However, for a microgrid in an island state, where an energy storage system, a synchronization power generator, a large number of power electronic devices and loads operate simultaneously in U/f control mode, a condition for synchronization grid connection is more difficult to meet, while data processing and information transmission are also more difficult, and higher timeliness is required.

At present, the grid connection technology used in a microgrid is mainly based on the improvement of the synchronization grid connection operation of the traditional power system. The method adopted in the disclosure "mode switching method for switching from island mode to grid-connected mode for microgrid" (Application No. 201110382606.2) is to shut down all distributed power supplies before grid connection of a microgrid, to ensure that non-synchronization grid connection does not occur, however, it will cause short-term load outage and affect users. The disclosure "microgrid synchronization grid connection method based on gradual phase approximation" (Application No. 201510549244.X) is to use a phase difference between a microgrid system and a grid system as a basis for synchronization determination and to adjust a voltage phase on the microgrid side by using a method of adjusting a set step, however, the synchronization adjustment of the voltage amplitude is not considered. In a grid connection method for a microgrid disclosed in the disclosure "smooth synchronization grid connection control method for microgrid" (Application No. 201410057243.9), a single-phase/three-phase adaptive synchronization grid connection detection and adjustment method is disclosed, which performs synchronization adjustment through automatic amplitude compensation and automatic phase angle compensation, however, this synchronization adjustment takes a long time. The disclosure "control method for synchronization closing and grid connection of microgrid group" (Application No. 201610580848.5) is mainly to control a grid connection frequency based on an inverter controlled by a power electronic interface, however, the microgrid group grid connection considered therein only refers to an integration of a large microgrid containing multiple small microgrids into the power system, that is to say, only one grid connection point is considered, and the situation of grid connection of multiple microgrid groups is not studied.

Most contents of the existing research on synchronization grid connection technology for microgrids mainly focus on how to stably and accurately control and adjust the voltage amplitude, frequency and phase on the microgrid side, and how to update the synchronization closing determination algorithm. However, the prerequisite for accurate calculation and control is to ensure the accuracy of the data used and to ensure the timeliness of system communication. In this regard, the currently used method is to improve sensor accuracy or data transmission quality, and improve data accuracy through uninterrupted multiple collections. For the synchronization gird connection of multiple microgrid groups, the existing technology is only to gradually connect to the grid on a system-by-system basis in a predetermined order, which is inefficient and cannot guarantee system stability. For problems of data collection during microgrid group synchronization and synchronization grid connection of multiple microgrid groups (multiple grid connection points), the present disclosure makes optimization and innovation with respect to data processing algorithms and communication control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure uses a voltage amplitude, frequency and phase angle of upper and lower ports of a circuit breaker as a basis for determination, and performs, based on a voltage estimation result across a of a synchronization control point, real-time power adjustment on a distributed power supply (mainly a voltage and frequency support power supply) in a microgrid by using fast proportional integration. While shortening a synchronization time, a synchronization condition can be accurately determined, so that a closing impact on the microgrid at both ends is smaller and a synchronization success rate is improved. The voltage estimation of the present disclosure establishes a differential equation model and an optimal estimation model for synchronization control, and uses optimal state estimation to acquire an optimal value of a state quantity required for the synchronization, which greatly improves the accuracy of the synchronization, thereby reducing the system impact of the synchronization closing, and improving the transient and dynamic stability of the system in the synchronization. The present disclosure establishes a synchronization condition boundary model for a single microgrid, and then establishes a synchronization condition boundary model for multiple microgrids groups, which can accurately determine the synchronization sequence, achieve stable synchronization, improve synchronization efficiency, and avoid the occurrence that distributed power supply synchronization within the microgrid groups cannot be adjusted (insufficient backup capacity), which damages system stability.

According to one aspect of the present disclosure, there is provided a synchronization control system for a microgrid group, wherein the microgrid group may include a plurality of microgrids, the system includes a central controller, and the central controller is configured to: receive a voltage measurement value at a grid connection point from each of the plurality of microgrids; perform proportional-integral adjustment on the voltage measurement value to obtain a difference between the voltage measurement value at a previous moment and a control value at a current moment, so as to estimate a control instruction at a next moment for each microgrid; and send a control instruction to at least one microgrid of the plurality of microgrids, to adjust closing synchronization between the plurality of microgrids through phase lock control.

The voltage measurement value may be sent in a time-driven manner per sampling period; and a sending time interval of the control instruction may be increased from a minimum time interval to a heartbeat time interval.

The central controller may be further configured to: receive the voltage measurement value from each microgrid through a SV protocol in an IEC 61850 standard; and send the control instruction to the at least one microgrid through a GOOSE protocol in the IEC 61850 standard, and perform individual verification for each frame of data transmitted via the SV/GOOSE protocol.

The central controller may be further configured to: perform optimal state estimation on the voltage measurement value on both sides of the grid connection point, so as to minimize an error of the control instruction.

The central controller may be further configured to: determine that a measurement error accumulation obtained by accumulating and summing the differences follows a Gaussian distribution.

The central controller may be further configured to: perform real-time verification of each voltage measurement value using a covariance of the voltage measurement value of a previous voltage cycle.

The central controller may be further configured to: obtain a direct-axis component and a quadrature-axis component of a discrete voltage value by performing a Park transformation on the voltage measurement value into a rotating Cartesian coordinate system and performing an orthogonal transformation, to serve as an input value for proportional-integral adjustment.

The central controller may be further configured to: determine an adjustment sequence of the plurality of microgrids based on a capacity of each of the plurality of microgrids, and determine, based on a margin in a current operating voltage parameter state, a synchronous regulation boundary of a microgrid that needs to be regulated.

The central controller may be further configured to: select a microgrid with a small capacity as a target to be regulated first in a same period, and change the target to be regulated under a condition that a voltage adjustment parameter exceeds the synchronization regulation boundary of the microgrid.

According to another aspect of the present disclosure, there is provided a synchronization control method for a microgrid group, wherein the microgrid group may include a plurality of microgrids, and the method includes: receiving a voltage measurement value at a grid connection point from each of the plurality of microgrids; performing proportional-integral adjustment on the voltage measurement value to obtain a difference between the voltage measurement value at a previous moment and a control value at a current moment, so as to estimate a control instruction for a next moment; and sending a control instruction to at least one microgrid of the plurality of microgrids, to adjust closing synchronization between the plurality of microgrids through phase lock control.

The voltage measurement value may be sent in a time-driven manner per sampling period; and a sending time interval of the control instruction may be increased from a minimum time interval to a heartbeat time interval.

The method may further include: receiving the voltage measurement value from each microgrid through a SV protocol in an IEC 61850 standard, and sending the control instruction to the at least one microgrid through a GOOSE protocol in the IEC 61850 standard; and performing individual verification for each frame of data transmitted via the SV/GOOSE protocol.

The method may further include: performing optimal state estimation on the voltage measurement value on both sides of the grid connection point, so as to minimize an error of the control instruction.

The method may further include: determining that a measurement error accumulation obtained by accumulating and summing the differences follows a Gaussian distribution.

The method may further include: performing real-time verification of each voltage measurement value using a covariance of the voltage measurement value of a previous voltage cycle.

The method may further include: obtaining a direct-axis component and a quadrature-axis component of a discrete voltage value by performing a Park transformation on the voltage measurement value into a rotating Cartesian coordinate system and performing an orthogonal transformation, to serve as an input value for proportional-integral adjustment.

The method may further include: selecting an adjustment sequence of the plurality of microgrids based on a capacity of each of the plurality of microgrids, and determine, based on a margin in a current operating voltage parameter state, a synchronous regulation boundary of a microgrid that needs to be regulated.

The method may further include: selecting a microgrid with a small capacity as a target to be regulated first in a same period, and change the target to be regulated under a condition that a voltage adjustment parameter exceeds the synchronization regulation boundary of the microgrid.

According to another aspect of the present disclosure, there is provided a computer-readable storage medium having stored thereon computer programs that, when executed by a processor, implement the synchronization control method for a microgrid group described above.

According to another aspect of the present disclosure, there is provided a computing device, including: a processor; a memory storing computer programs that, when executed by the processor, implement the synchronization control method for a microgrid group described above.

BRIEF DESCRIPTION OF THE DRAWINGS

The above and other aspects, features and advantages of the present disclosure will be more clearly understood from the following detailed description taken in conjunction with the accompanying drawings, wherein.

DETAILED DESCRIPTION

Figure 1:
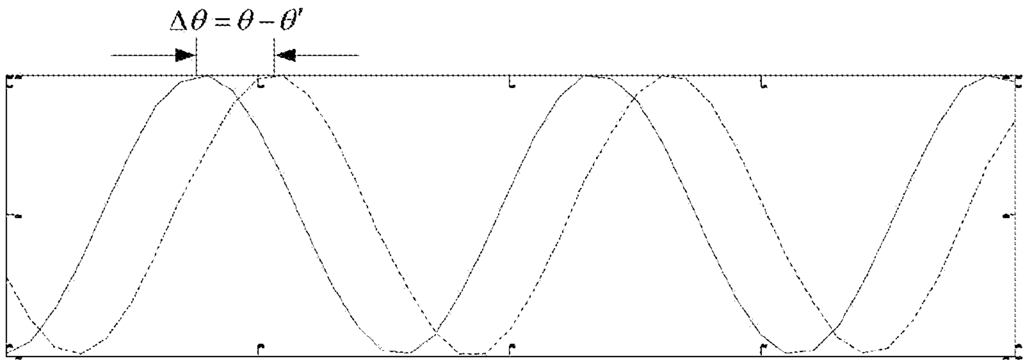
FIG. 1 is a single-phase voltage curve diagram at both ends of a circuit breaker without synchronization control.

The following embodiments are provided to assist the reader in gaining a comprehensive understanding of the methods, devices, and/or systems described herein. However, various alterations, modifications, and equivalents to the methods, devices, and/or systems described herein will be apparent to those of ordinary skill in the art. For example, the order of operations described herein is merely an example and is not limited to the order set forth herein, and other than operations that must occur in a specific order, changes that will be apparent to those of ordinary skill in the art may be made. Additionally, in order to improve clarity and conciseness, descriptions of features and structures that would be known to those of ordinary skill in the art may be omitted. Features described herein may be implemented in different forms and are not to be construed as limited to the examples described herein. Rather, the examples described herein have been provided so that the present disclosure will be thorough and complete, and will fully convey the scope of the present disclosure to those of ordinary skill in the art.

The following are definitions of some technical terms used in the present disclosure:

Microgrid: multiple distributed energy sources and loads with clear electrical boundaries interconnect, and it is a single controllable system that can operate in either grid-connected mode or island mode (refer to the description in IEC 60050-617:2017 "Group of interconnected loads and distributed energy resources with defined electrical boundaries forming a local electric power system at distribution voltage levels, that acts as a single controllable entity and is able to operate in either grid-connected or island mode").

Synchronization: under a condition that a power generator is connected to the grid, the voltage, frequency, and phase generated by the power generator are required to be consistent with the grid within a same period.

Island: a portion of a power system that is disconnected from the rest but still has electricity.

Transient disturbance: instantaneous and severe voltage and current changes caused by switching of power generation equipment in the microgrid, load start and stop, unintentional islanding or faults of the microgrid. It is characterized by large fluctuation amplitude and obvious phase changes, which continue for a period of Oms to 50 ms (refer to the description in IEC TS 62898-3-1:2020 "Sudden and severe voltage and current changes in a microgrid caused by switching of generation or load, unintentional islanding or faults, characterized by large magnitude and phase changes and continuing for a period of Oms to 50 ms").

Dynamic disturbance: a series of changes in microgrid voltage and current caused by a high penetration ratio and intermittency of renewable energy sources, non-linear loads, intentional islanding of the microgrid, output power fluctuation of renewable energy sources and grid side faults, which continue for a period of 50 ms to 2 s (refer to the description in IEC TS 62898-3-1:2020 "Series of voltage and current changes in a microgrid caused by output of renewable energy sources reaching a sufficiently high proportion, non-linear loads, intentional islanding, intermittency and output power fluctuation of renewable energy resources and grid side faults, which continue for a period of 50 ms to 2 s").

SV (Sampled Value): sampled value, also called SMV (Sampled Measured Value).

GOOSE: Generic Object Oriented Substation Events.

Optimal state estimation: under a certain determined estimation criterion condition, according to a certain statistical significance, the estimated state is optimal.

Voltage amplitude: in a cycle, a maximum absolute value of alternating current instantaneously occurs, which is also half a distance from peak to trough in a voltage sine wave.

Frequency of voltage: a number of times a voltage vector completes periodic changes per unit time.

Phase angle of voltage: also known as a phase angle, which refers to a value that determines its state at any moment (or position) under a condition that a voltage vector changes with time (or position in space) as a sine or cosine.

The existing synchronization technology is based on locally installed measurement and control equipment to detect the voltage at both ends of a circuit breaker port that needs to be closed simultaneously, and makes synchronization determination based on the voltage amplitude, frequency and phase angle. However, the synchronization time is relatively long, and it is difficult to strictly determine the synchronization condition, which will have a great impact on the grid at both ends of the circuit breaker port, and in serious cases lead to synchronization failure.

Figure 2:
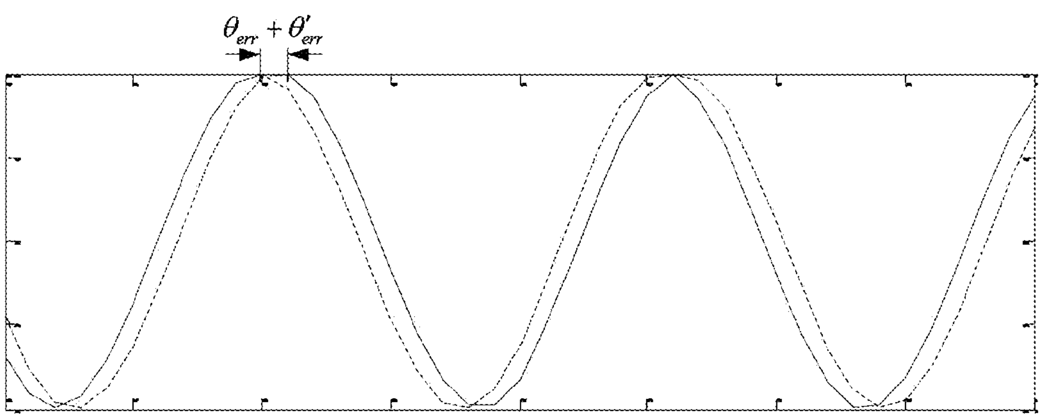
FIG. 2 is a single-phase voltage curve diagram at both ends of a synchronization controlled circuit breaker without voltage state estimation.

FIG. 1 is a single-phase voltage curve diagram at both ends of a circuit breaker without synchronization control. FIG. 2 is a single-phase voltage curve diagram at both ends of a synchronization controlled circuit breaker without voltage state estimation. Referring to FIG. 1, without applying a synchronization control strategy, a voltage across a circuit breaker break cannot quickly meet a synchronization condition. Even if the synchronization requirement is met under an accidental condition, it only exists temporarily and cannot be used as a necessary condition for synchronization closing. In this case, although a voltage across a synchronization control point calculated by a controller in the system based on the data uploaded by communication meets the synchronization closing condition and a closing instruction is issued to the synchronization control point, due to a deviation of the voltage value during an acquisition or communication transmission process, there is an error in a phase angle calculated by a phase-locked loop (which also has an error) after various errors are superimposed. Referring to FIG. 2, at this time, an error value of an actual voltage phase angle adjusted by a synchronization PI regulator is recorded as der, $\theta_{err}+\theta'_{err}$. An actual maximum error may be $\theta_{err}+\theta'_{err}$, this error is a superposition of errors for acquisition and calculation on both sides of the break, and this error may satisfy Equation 1:

$$|\theta_{err}+\theta'_{err}|>\theta_{ref} \qquad (1)$$

wherein $\theta_{ref}$ represents a maximum value of a phase angle difference of the voltages on both sides of the break allowed by synchronization condition. At this time, the system actually does not meet the synchronization condition. After the controller issues a closing instruction, a large inrush current and voltage dynamic instability will occur between the microgrids, and in serious cases, will lead to synchronization failure and affect the safe and stable operation of the system.

It can be seen that the existing grid connection synchronization technology cannot meet the requirements for precise synchronization control of microgrids or microgrid groups. First, a power generation unit and energy storage system of a microgrid are generally connected through power electronic equipment, and the power supply has weak impact resistance and can be overloaded by up to twice a rated current. Traditional synchronization technology can easily cause the system current to be too large and cause premature protection. Secondly, most microgrid systems have weak inertia, weak transient stability and dynamic stability capabilities, and the transient and dynamic processes of the system during the synchronization are likely to cause synchronization failure. Moreover, a system capacity of island operation for the microgrid is small and a reserve capacity is insufficient, so that a small system disturbance will cause the microgrid to have a long dynamic response time and a large amplitude of voltage dynamic oscillation.

When two island-operated microgrids need to be operated in parallel at the same time, we must first consider which microgrid should be used as a reference, and secondly consider meeting an absolute condition for synchronization. The existing synchronization technology cannot solve these problems well. At the same time, an existing on-site synchronization controller usually receives a superior control instruction for synchronization closing. However, synchronization control for a microgrid group composed of multiple microgrids involves multiple synchronization control points and the synchronization control points are far away from the synchronization controller, and thus direct acquisition of voltage data and direct control of switch opening and closing not only cannot meet a requirement for long-distance, but also cannot meet a requirement for time. In addition, the existing technology cannot realize automatic synchronization and automatic determination of an optimal order of the synchronization. Therefore, it is necessary to calculate operating states of all systems in a synchronization control system to achieve rapid communication and solve the problem of long-distance information transmission.

In addition, a microgrid group involves multiple synchronization control points. The synchronization control points are far away from the synchronization controller. Direct acquisition of voltage data and direct control of switch opening and closing cannot meet the requirement for long-distance. The present disclosure uses the SV and GOOSE communication methods of IEC 61850 to collect real-time switching status and voltage values and perform real-time remote control on a synchronization circuit breaker. This communication control method can solve the problems of remote communication and multiple synchronization control points.

The synchronization control system of the present disclosure collects the status information of the synchronization control point and the voltage real-time data on both sides of the circuit breaker break at the synchronization control point. Since the synchronization process requires strict synchronization, the B-code time synchronization of a time synchronization server is used. For synchronization between multiple microgrids or under a condition that the synchronization control point is far away from a core equipment of the synchronization, optical fiber communication is used to ensure the real-time and non-distortion of a sampling signal, and the IEC 61850 communication method is used for real-time transmission of voltage data and real-time feedback and remote control of switching signals.

Figure 3:
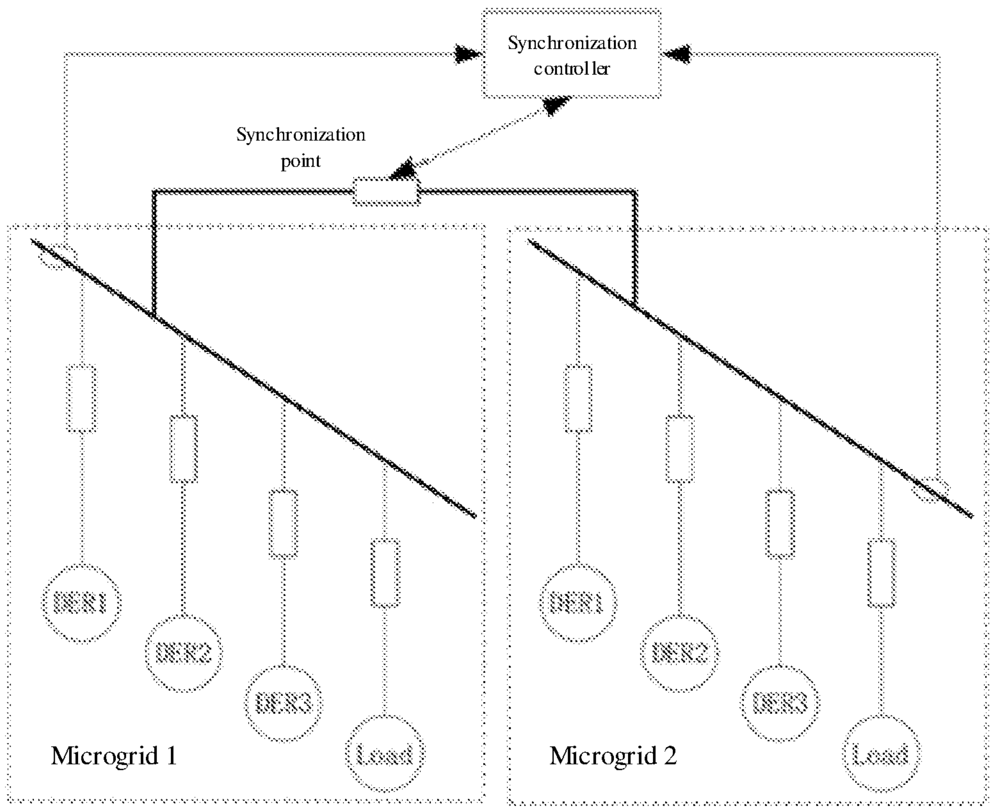
FIG. 3 is a topology diagram of two microgrids based on a synchronization control method of local direct acquisition and direct control.

FIG. 3 is a topology diagram of two microgrids based on a synchronization control method of local direct acquisition and direct control. Referring to FIG. 3, a typical microgrid 1 in an industrial park may include three distributed power supplies DER1, DER2 and DER3 and a load Load, but is not limited thereto. The distributed power supply DER1 operating in U/f mode serves as a main supporting power supply in the microgrid system and can ensure the stability of the island operation of microgrid 1. It can be a stable micro power supply such as an energy storage system, micro gas turbine, diesel engine, etc. The distributed power supply DER2 and distributed power supply DER3, as PQ power supplies in the microgrid system, may be fluctuating and intermittent power generation sources, such as wind power generation and photovoltaic power generation. The load Load may be a 10 kV power load in the industrial park. The microgrid 2 may include three distributed power supplies DER1, DER2 and DER3 and a load Load that are the same or similar to microgrid 1. The distributed power supply DER1 operating in U/f mode serves as a main supporting power supply in the microgrid system and can ensure the stability of the island operation of microgrid 2. It can be a stable micro power supply such as an energy storage system, micro gas turbine, diesel engine, etc. The distributed power supply DER2 and distributed power supply DER3, as PQ power supplies in the microgrid system, may be fluctuating and intermittent power generation sources, such as wind power generation and photovoltaic power generation. The load Load is another 10 kV load in the industrial park.

The synchronization control point may be a circuit breaker between two microgrids when parallel operation or splitting operation is required. When both the microgrid 1 and microgrid 2 operate independently, the microgrid 1 may have a situation where a power generation power of the distributed power supply exceeds a load power and needs to be limited in power, and the microgrid 2 may have a situation where a power generation power of the distributed power supply is insufficient to support the industrial load. Therefore, it is necessary to operate two microgrids in parallel to improve energy utilization and ensure load power consumption. At the same time, under a condition that a line in microgrid 1 or microgrid 2 fails, it is necessary to split the synchronization control point between microgrids to maximize the reliability and redundancy of system power supply and minimize economic losses.

The tie lines of multiple microgrids operating in parallel are generally resistive. Therefore, the synchronization between microgrid 1 and microgrid 2 is the synchronization between bus voltages of the two microgrids. Assuming that a three-phase voltage on a bus of microgrid 1 is $V_{abc}$, and a three-phase voltage on a bus of microgrid 2 is $V'_{abc}$. Through the phase-locked calculation of voltages of the two buses by a phase-locked loop, the voltage amplitude, voltage phase angle and frequency on the two buses may be obtained. Three elements of the bus voltage of microgrid 1 are $V_m$、 θ and ω respectively, where $V_m$ is a voltage amplitude of the bus voltage of microgrid 1, θ is a phase angle of the bus voltage of microgrid 1, and ω is an angular frequency of the bus voltage of microgrid 1. Three elements of the bus voltage of Microgrid 2 are $V_m$、 θ' and ω' respectively, where $V_m$ is a voltage amplitude of the bus voltage of Microgrid 2, θ' is a phase angle of the bus voltage of Microgrid 2, and ω' is an angular frequency of the bus voltage of microgrid 2. Conditions for meeting synchronization closing are as follows:

$$|V_m - V'_m| \leq V_{ref} \tag{2}$$

$$|\theta - \theta'| \leq \theta_{ref} \tag{3}$$

$$|\omega - \omega'| \leq \omega_{ref} \tag{4}$$

In the above equations 2 to 4, $V_{ref}$ represents a maximum value of a voltage difference between two buses allowed by the synchronization conditions, Pres represents a maximum value of a phase angle difference between two buses allowed by the synchronization conditions, and $\omega_{ref}$ represents a maximum value of an angular frequency difference between two buses allowed by the synchronization conditions. In practice, these thresholds may be preset based on standards or actual microgrid operating conditions.

A synchronization mode of direct acquisition and direct control for locally installed collection equipment (which may be a voltage sensor such as a voltage transformer or a voltage divider) and control equipment (for example, a controller) is to directly collect voltage parameters of the buses of two microgrids through secondary electrical lines. The sampled values are sent directly to the synchronization controller. The synchronization controller uses secondary electrical lines to control a relay in and out to achieve synchronization closing at the synchronization control point. However, in this method, one synchronization device can only correspond to one synchronization control point, and under a condition that a distance between the two microgrids is far, there will be a phenomenon that the voltage collection data signal is weakened and the control signal is distorted.

PREFERRED EMBODIMENTS OF THE PRESENT DISCLOSURE

Figure 4:
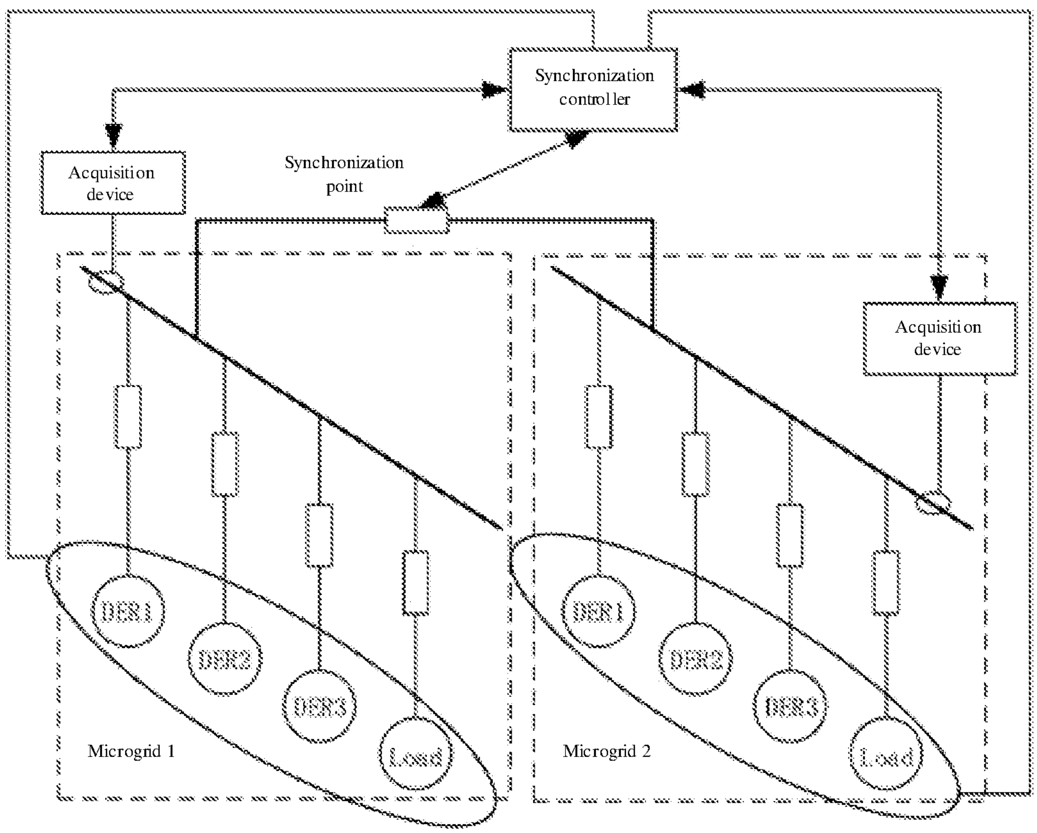
FIG. 4 is a topology diagram of a synchronization control method using an IEC 61850 protocol.

FIG. 4 is a topology diagram of a synchronization control method using an IEC 61850 protocol. Herein, repeated description of the same or similar portions in the drawings will be omitted, and only differences will be described. Referring to FIG. 4, in a synchronization control system for a microgrid group according to the present disclosure, voltages between the two microgrid buses are acquired in real time through acquisition devices, and the acquired voltage measurement values are filtered and framed in accordance with the IEC 61850 communication method. The synchronization controller is to: receive the voltage measurement value of a grid connection point from the acquisition device of each microgrid through the IEC 61850 communication method (the voltage measurement value is sent in a time-driven manner per each sampling period); estimate a control instruction at a next moment for each microgrid based on the voltage measurement value; and send the control instruction to the microgrid that needs to be adjusted through the IEC 61850 communication method (a sending time interval of the control instruction increases from a minimum time interval to a heartbeat time interval), to adjust closing synchronization between the multiple microgrids through phase lock control.

Figure 5:
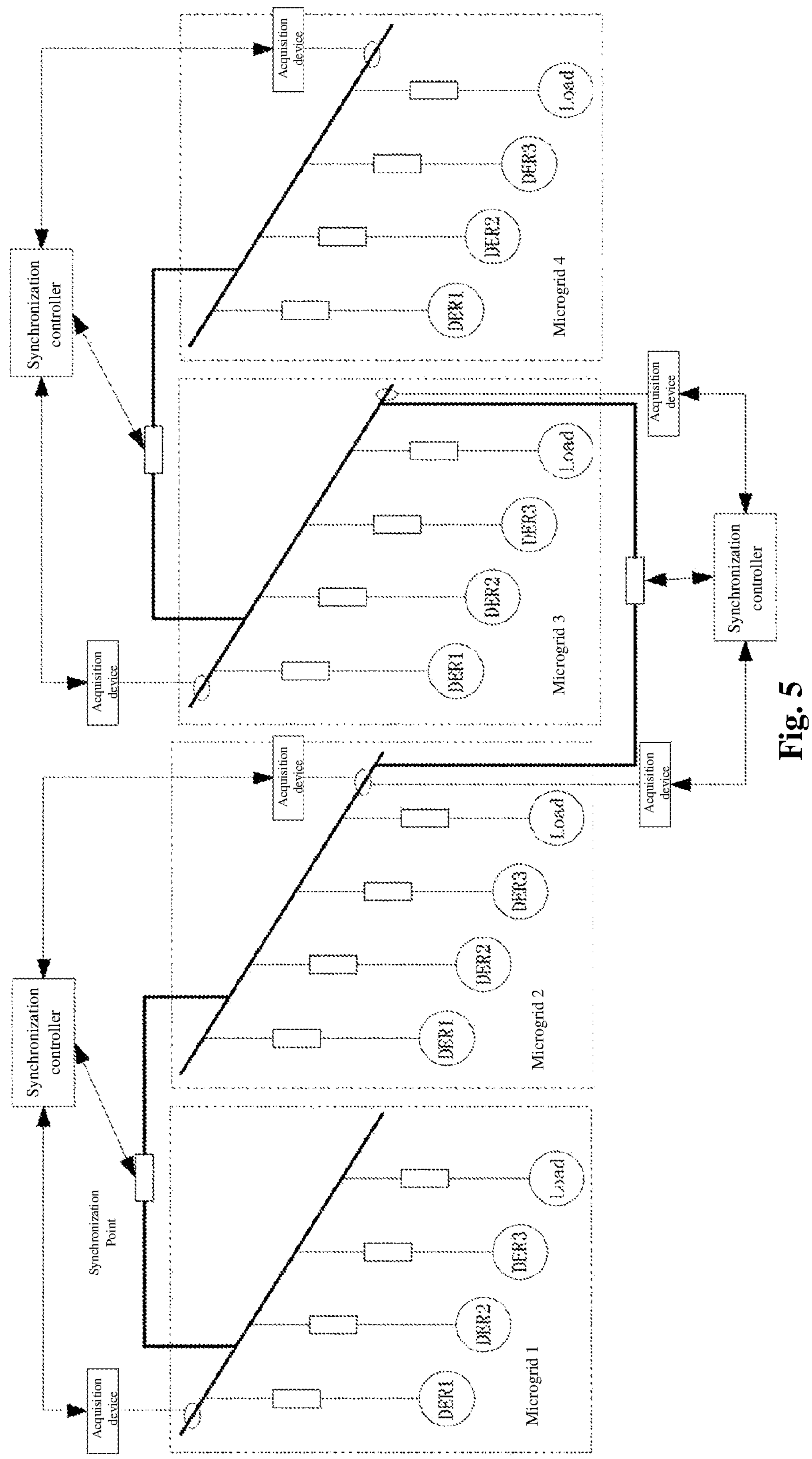
FIG. 5 is a topology diagram of a synchronization control of multiple microgrids in a traditional mode.
Figure 6:
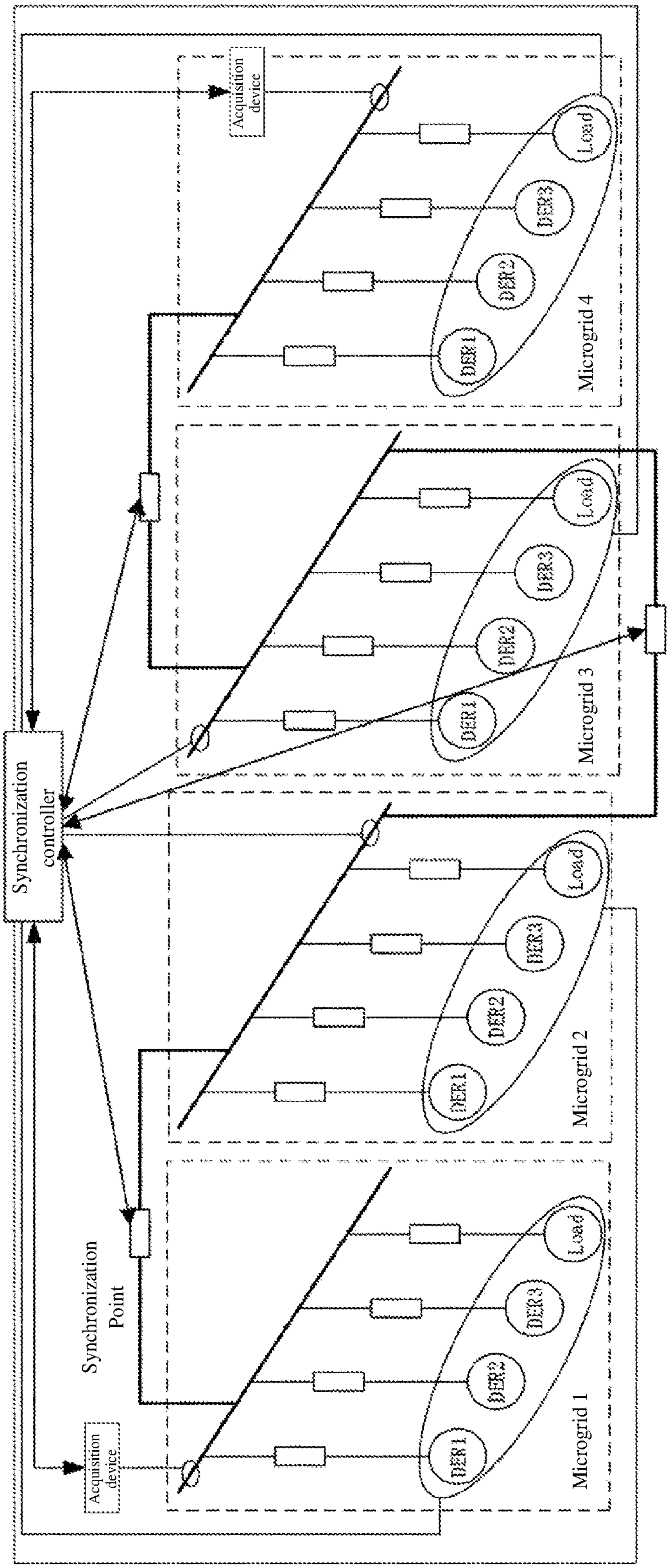
FIG. 6 is a topology diagram of a synchronization control system according to the present disclosure.

FIG. 5 is a topology diagram of a synchronization control of multiple microgrids in a traditional mode. FIG. 6 is a topology diagram of a synchronization control system according to the present disclosure.

Referring to FIG. 5, in the traditional mode, under a condition that four microgrids need to be operated in parallel, three synchronization control devices are required to work together. The three synchronization control devices all use direct acquisition and direct control. In this synchronization method, a synchronization sequence must be agreed in advance, which results in low synchronization efficiency and the synchronization process cannot guarantee the stability and economy of the system after parallel synchronization. For example, under a condition that the synchronization between microgrid 1 and microgrid 2 is completed, the system will enter a new stable interval. It is possible that transient instability or dynamic instability problems may occur before entering the new stable interval, causing the system to split again, and the synchronization closing operation fails.

Referring to FIG. 6, for the synchronization problem that multiple microgrids operate in isolated islands, according to embodiments of the present disclosure, only one synchronization central controller is provided in the synchronization control system for the microgrid group, which can improve economy and complete the synchronization and parallel operation of multiple microgrids with optimal time and minimum inrush current, ensuring the economy and stability of microgrid island operation. The synchronization control systems of multiple microgrids also use the IEC 61850 communication and long-distance optical fiber transmission method to ensure real-time communication and no signal distortion.

According to embodiments of the present disclosure, real-time collection data of voltage measurement values and current measurement values are collected directly through local data acquisition device, ensuring real-time data. Directly collected voltage and current analog data cannot be transmitted over a long distance, so local data acquisition device is required to convert analog quantities into digital quantities for SV communication of IEC 61850. The digital quantities are framed according to the communication protocol of IEC 61850. The local acquisition device sends the collected information to the synchronization central controller through the communication network (for example, optical fiber or wireless communication) to ensure that the signals sent to the synchronization central controller are real-time and the signals are not distorted. In addition, the local data acquisition device can acquire the switching status of the synchronization circuit breaker and directly control the circuit breaker. The circuit breaker status acquisition can be sent to the synchronization central controller via the communication network through the GOOSE communication method of IEC 61850. The synchronization central controller sends the synchronization control signal to the local controller through optical fiber using the GOOSE communication method of IEC 61850 to directly control the circuit breaker.

Figure 7:
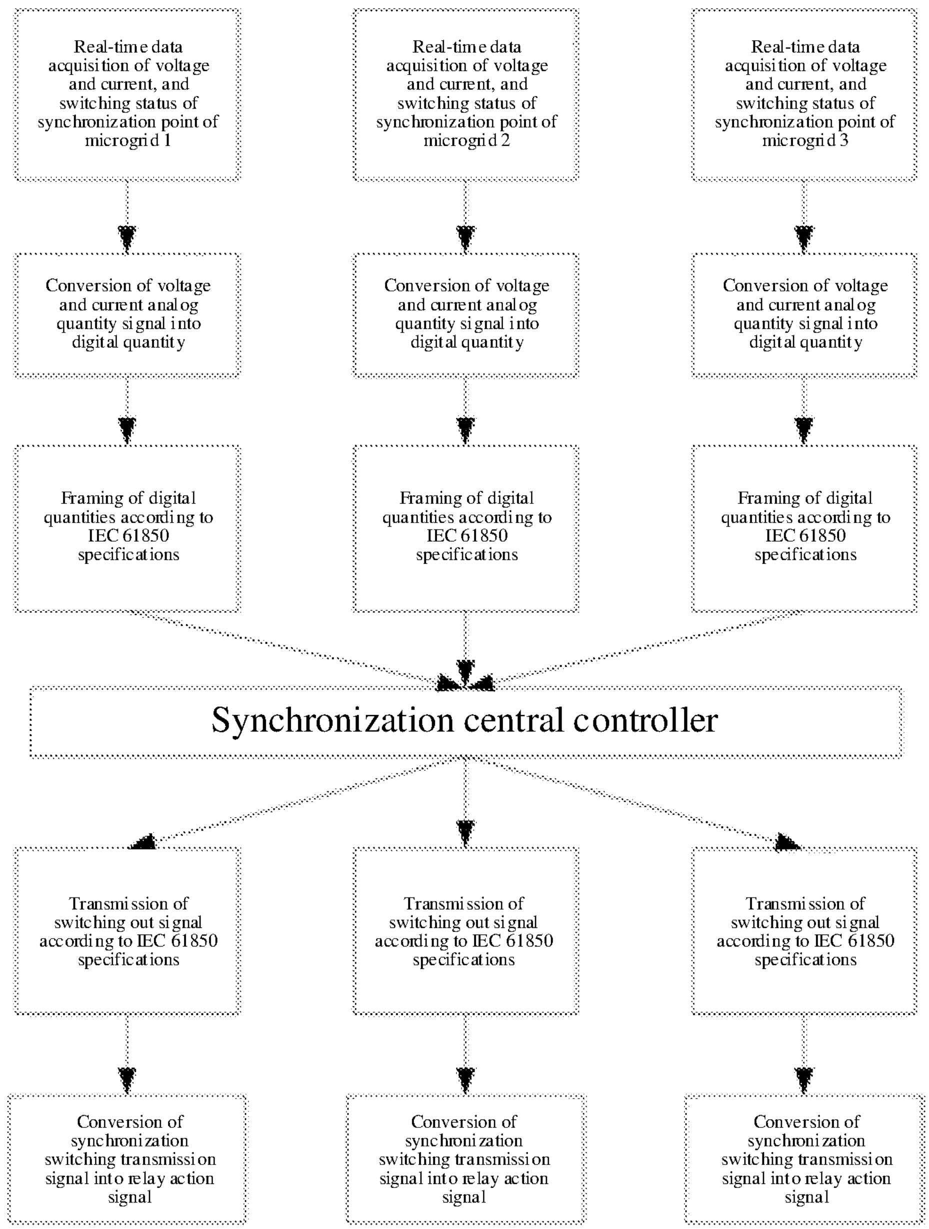
FIG. 7 is a block diagram of a synchronization control system according to the present disclosure.

FIG. 7 is a block diagram of a synchronization control system according to the present disclosure. Referring to FIG. 7, the synchronization central controller is responsible for the decoding function of the input information and the subsequent IEC 61850 encoding function. The synchronization central controller performs optimal estimation of the status information sent to it and obtains an optimal value for actual operation to improve the system controllability. The optimal estimation acquires the voltage amplitude, phase and frequency of the measurement point; performs phase locking based on the real-time voltage estimation value; performs a synchronization comparison algorithm based on the acquired voltage amplitude, phase and frequency and uses PI adjustment to quickly adjust the voltage amplitude, phase and frequency respectively to achieve synchronization closing operation.

Figure 8:
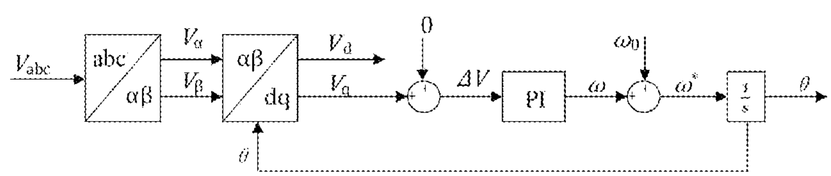
FIG. 8 is a block diagram of a principle of a three-phase synchronization phase-locked loop according to the present disclosure.

FIG. 8 is a block diagram of a principle of a three-phase synchronization phase-locked loop according to the present disclosure. Referring to FIG. 8, the grid is in a three-phase balanced state during normal operation, and three-phase synchronization phase locking technology is used herein. A direct axis component and a quadrature axis component of a discrete voltage value are obtained by performing Park transformation on the voltage measurement value into a rotating rectangular coordinate system and performing orthogonal transformation, and are used as input values for proportional-integral adjustment. An input of the phase-locked loop is a real-time sampling value of a three-phase voltage. A direct axis component and a quadrature axis component of a discrete voltage value are obtained by performing Park transformation on the voltage measurement value into a rotating rectangular coordinate system and performing orthogonal transformation, and are used as input values for proportional-integral adjustment. That is, a three-phase voltage vector of a measured value $V_{abc}$ is transformed from the natural coordinate system to a dq synchronization rotating coordinate system using Park transformation, wherein a d-axis component contains voltage amplitude information, and a q-axis component contains voltage phase information and frequency information. Under a condition that the q-axis component is 0, $V_d$ represents the voltage amplitude. Therefore, the q-axis component of an actual voltage takes a value of 0 as a reference and its deviation from the 0 value is input into the PI regulator module. An adjustment result is superimposed with an original frequency $\omega_0$ of the grid to obtain an angular frequency $\omega^*$, and a phase angle of voltage may be obtained by performing integral calculation on $\omega^*$. This phase locking method can quickly lock phase with high precision under normal grid environment.

Figure 9:
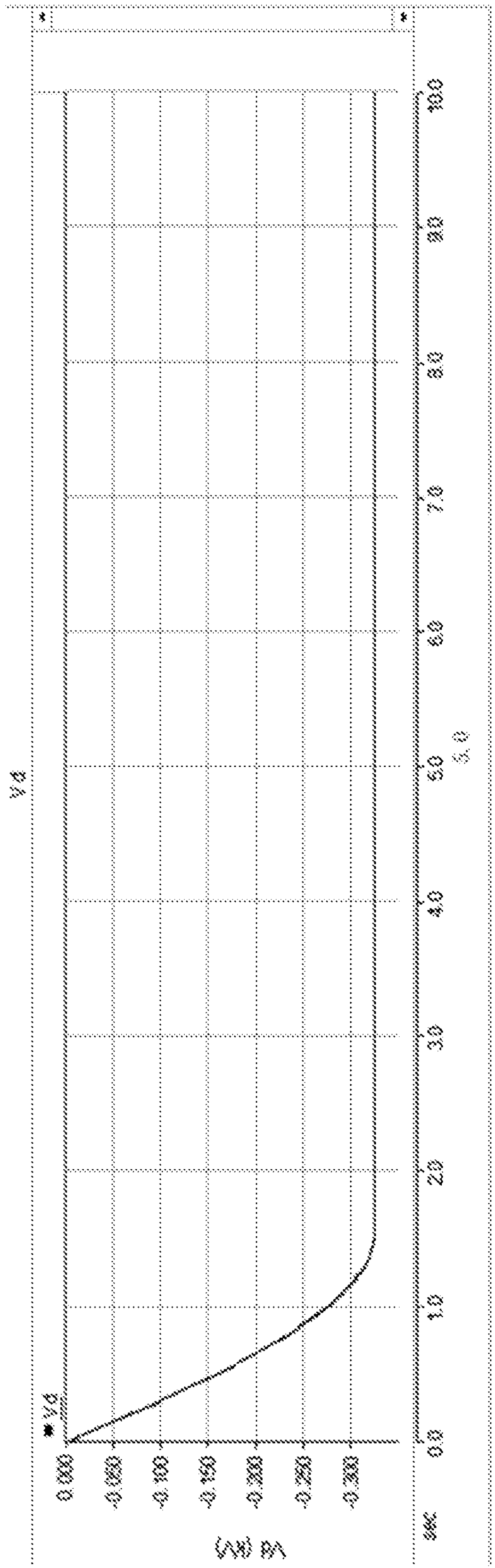
FIG. 9 is a graph of a voltage amplitude ($V_d$) output by a phase-locked loop according to the present disclosure.
Figure 10:
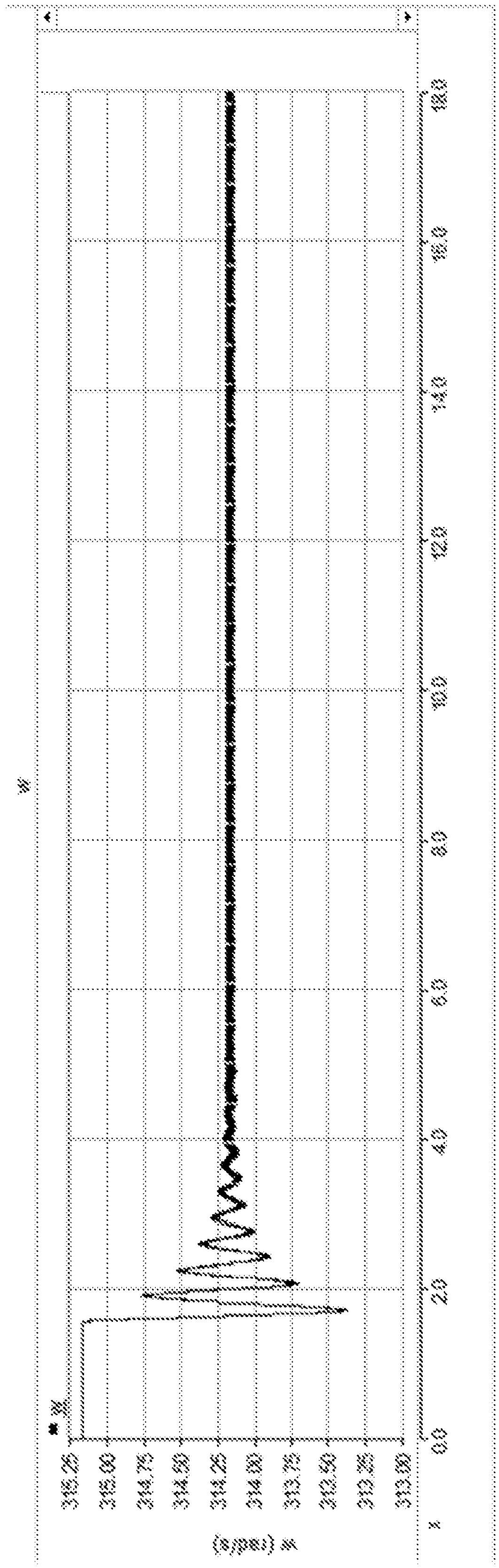
FIG. 10 is a graph of an angular frequency ($\omega$) output by a phase-locked loop according to the present disclosure.
Figure 11:
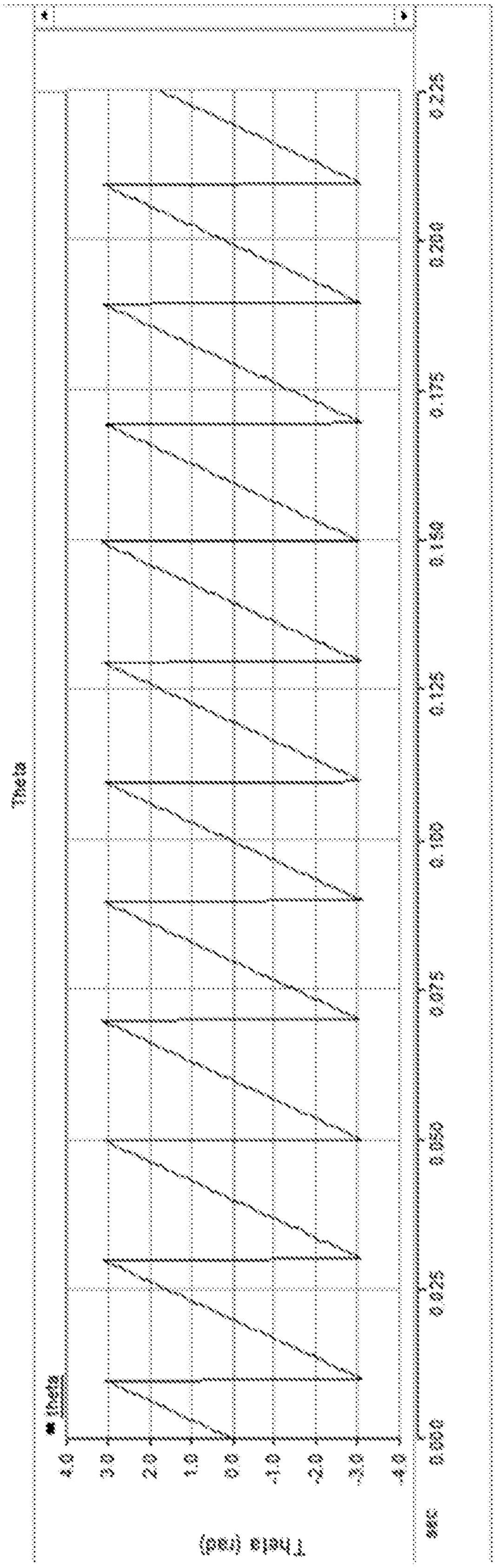
FIG. 11 is a graph of a phase angle of voltage ($\theta$) output by a phase-locked loop according to the present disclosure.

FIG. 9 is a graph of a voltage amplitude ($V_d$) output by a phase-locked loop according to the present disclosure. FIG. 10 is a graph of an angular frequency ($\omega$) output by a phase-locked loop according to the present disclosure. FIG. 11 is a graph of a phase angle of voltage ($\theta$) output by a phase-locked loop according to the present disclosure.

During the phase locking process, the output $V_d$、$\omega^*$ and $\theta$ are the above-mentioned three synchronization elements I'm. 0 and w. Based on the above principles, the algorithm and model of the three-phase synchronization phase-locked loop are tested in a typical microgrid model, and the abc three-phase voltage on the microgrid bus is sampled. In this way, the three-phase synchronization phase-locked loop can accurately and quickly obtain the required status quantity. The phase locking results are shown in FIGS. 9 to 11. It can be obtained that the adjustment process is gradually adjusted in a short period of time until each state quantity reaches stability, wherein the response time and accuracy of the phase locking are controlled by adjusting the PI regulator parameters.

According to embodiments of the present disclosure, the synchronization central controller performs the phase locking process of the phase-locked loop and uses fast proportional-integral adjustment (PI adjustment) for the distributed power supply voltage amplitude, frequency and phase adjustment processes. The PI regulator is a linear controller, to obtain a control difference based on a given value and an actual output value, and linearly combine the proportional-integral of the difference to obtain a control quantity to control a controlled object. The proportional parameter $K_p$ controls a response speed of a deviation adjustment. Generally, as the value increases, the system response speed will speed up, but when it increases to a certain extent, the system will become unstable. The main function of integral adjustment is to eliminate the steady-state error of the system and improve the error-free degree. The larger the value of the integral parameter $K_i$, the weaker the integral effect, and vice versa. The smaller the overshoot of the closed-loop system, the slower the response speed of the system will be.

Figure 12:
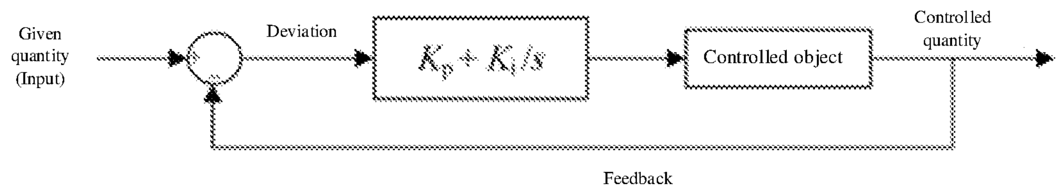
FIG. 12 is a block diagram of a principle of a PI regulator according to the present disclosure.

FIG. 12 is a block diagram of a principle of a PI regulator according to the present disclosure. Referring to FIG. 12, the data acquisition device configured to collect the voltage, current and real-time status of the switch at the synchronization control point collects the necessary status signals of the synchronization control point and the microgrid system. This status can also be calculated based on the system model.

Figure 13:
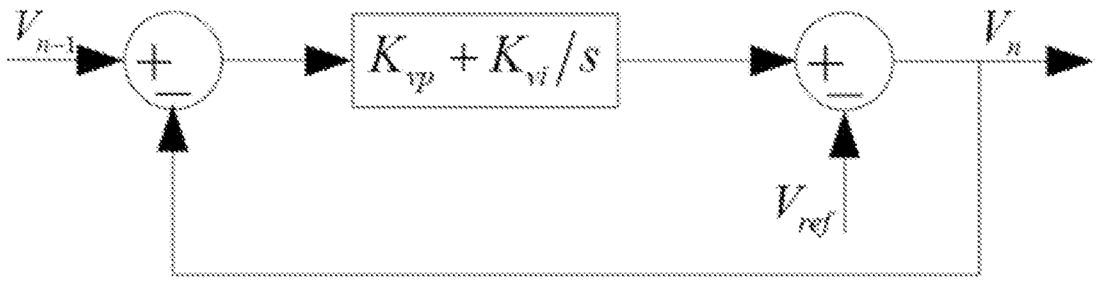
FIG. 13 is a block diagram of voltage amplitude control using a PI regulator according to the present disclosure.
Figure 14:
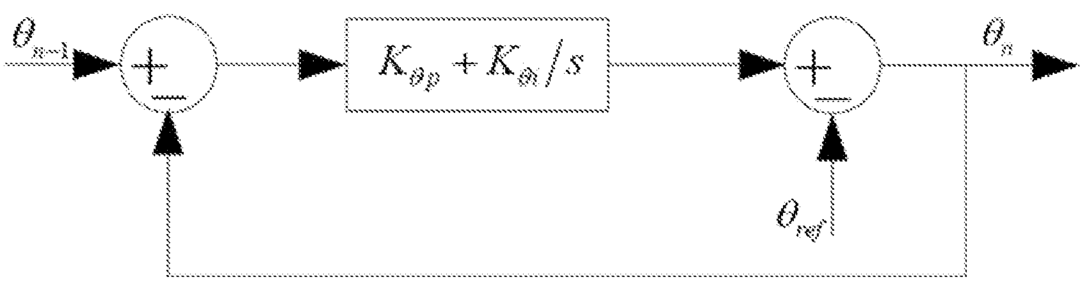
FIG. 14 is a block diagram of phase angle control using a PI regulator according to the present disclosure.
Figure 15:
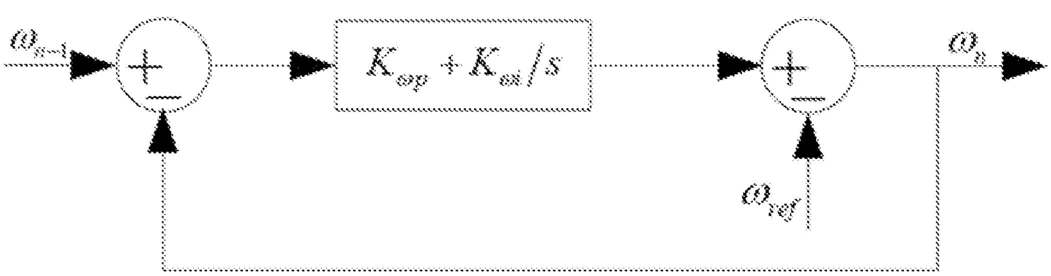
FIG. 15 is a block diagram of angular frequency control using a PI regulator according to the present disclosure.

FIG. 13 is a block diagram of voltage amplitude control using a PI regulator according to the present disclosure. FIG. 14 is a block diagram of phase angle control using a PI regulator according to the present disclosure. FIG. 15 is a block diagram of angular frequency control using a PI regulator according to the present disclosure.

The PI regulator in the controller performs proportional-integral adjustment on the voltage measurement value to obtain a difference between the voltage measurement value at a previous moment and a control value at a current moment, so as to estimate a control instruction at a next moment. According to the block diagram of voltage amplitude control, a mathematical model for calculating a voltage amplitude of the synchronization is established as follows:

$$V_{ref}-\left[(V_{n-1}-V_n)\cdot K_{vp}+(V_{n-1}-V_n)\cdot K_{vi}/s\right]=V_n \tag{5}$$

In the equation (5), $V_{ref}$ can be considered to be a fixed value in a linear system or local linear calculation. $K_{vp}$ represents a proportional coefficient of voltage amplitude control, $K_{vi}$ represents an integral coefficient of voltage amplitude control, $V_n$ represents an output value calculated by the controller, and $V_{n-1}$ represents a voltage amplitude status value feedback. The above equation (5) is re-transformed to write an integral term separately from the remaining terms to get the following equation:

$$(V_n-V_{n-1})\cdot K_{vi}/s=V_n-V_{ref}+(V_{n-1}-V_n)\cdot K_{vp} \tag{6}$$

The above equation (6) is transformed into a differential form, to obtain a discretized model as follows (if $T_{sample}$ is used to represent an actual system sampling period):

$$K_{vi}\cdot T_{sample}\cdot\sum_{n=1}^{n}(V_n-V_{n-1})=V_n-V_{ref}+(V_{n-1}-V_n)\cdot K_{vp} \tag{7}$$

It can be seen from the difference equation that the integral term actually represents an accumulation of errors during the calculation process. The present disclosure approximately believes that a state quantity follows a Gaussian distribution, and the error accumulation can also be considered to follow a Gaussian distribution, since the results of actual calculation and theoretical simulation can also show that the error is similar to Gaussian white noise. Therefore, the above control system model can be expressed as follows:

$$V_n=\frac{-K_{vp}}{1-K_{vp}}\cdot V_{n-1}+\frac{1}{1-K_{vp}}V_{ref}+\frac{K_{vi}\cdot T_{sample}}{1-K_{vp}}\cdot\sum_{n=1}^{n}(V_n-V_{n-1}) \tag{8}$$

In addition, the following equations may be obtained by doing the following sorting and settings:

$$\begin{aligned} u(n)&=V_{ref}\\ V_n&=V(n)\\ V_{n-1}&=V(n-1)\\ \omega(n)&=K_{vi}\cdot T_{sample}/(1-K_{vp})\cdot\sum_{n=1}^{n}(V_n-V_{n-1})\sim N(\mu_0,\sigma_0^2)\\ A&=-K_{vp}/(1-K_{vp})\\ B&=1/(1-K_{vp}) \end{aligned} \tag{9}$$

Since the measurement error accumulation obtained by accumulating and summing the differences follows a Gaussian distribution, the error may be eliminated through accumulation herein. Then the model of the voltage amplitude control system is re-expressed as follows:

$$V(n)=A\cdot V(n-1)+B\cdot u(n)+\omega(n) \tag{10}$$

The present disclosure applies optimal state estimation to the synchronization control between medium-voltage microgrid groups, performs optimal state estimation on the voltage measurements on both sides of the synchronization grid connection point, to obtain a relatively accurate voltage value for use in the control instruction, so that the control instruction error is minimal. In the absence of a relatively accurate voltage input, the voltage amplitude, phase and frequency required for the synchronization may not meet the synchronization closing condition due to a measurement error, an calculation error or communication quality, resulting in a relatively large inrush current on the synchronization closing contact bus, thereby causing synchronization closing failure.

The present performs optimal state estimation on the voltage data at both ends of the synchronization control point based on the mathematical model of synchronization control to ensure that an error of the obtained state information at the next moment is minimal. Herein, a size of the error may be characterized by a covariance of the measured value within the sampling period. Since the input data required for the model are calculated through sampling points, the model is a discretized mathematical model. The mathematical model of the microgrid voltage is discretized to obtain the discretized mathematical model of optimal state estimation as follows:

$$y(t)=A\cdot y(t-1)+B\cdot u(t)+\omega(t) \tag{11}$$

In this model, y(t) represents a state value at the current moment, which may represent the voltage amplitude, phase angle or frequency at the current moment. y(t−1) represents a state value at the previous moment, which may represent the voltage amplitude, phase angle or frequency obtained at the previous sampling moment. u(t) represents a control effect of the system, which may represent a control effect of the synchronization. w(t) represents an error that occurs in calculation and other processes. It is considered that the error follows a Gaussian distribution, a covariance of the error is Σ0, and a mean value is μ0. A and B respectively represent the control system parameters. According to the present disclosure, each voltage measurement value may also be verified in real time using the covariance of the voltage measurement value of a previous voltage cycle.

The voltage-related data at both ends of the synchronization control point may also be measured by sensors, the discretized measurement system may be expressed as follows:

$$x(t)=C\cdot y(t)+v(t) \tag{12}$$

In the above equation, x(t) represents a measured value of voltage amplitude, phase angle or frequency at a current sampling moment, v(t) represents an error of the measurement system. The measurement error may also be considered to follow the Gaussian distribution, and a covariance of the measurement error is Σ1, and a mean value is μl.

In order to obtain the optimal estimation value of the system, the mathematical model of the calculation process is used to predict a next state of the system. If the current moment is t, then a state at the current moment may be predicted based on a state at a previous moment, the expression is as follows:

$$y\langle t\mid t-1\rangle=A\cdot y\langle t-1\mid t-1\rangle+B\cdot u\langle t\rangle \tag{13}$$

In the above equation, y<t|t−1> represents a result predicted based on a previous state, y<t−1|t−1 represents an optimal value at a previous moment, u t represents a control effect of the control system. Since y<t−1|t−1 represents an optimal value of a probability distribution of the previous state (an expected value of the probability distribution in the weighted optimal case), an estimation value y<t|t−1> at the current moment reproduced based on the previous moment also follows a similar probability distribution. A covariance of the estimation value y<t|t−1> at the current moment is calculated as follows (for details, please refer to the stochastic process):

$$\sum\langle t\mid t-1\rangle=A\cdot\sum\langle t-1\mid t-1\rangle\cdot A'+\sum\nolimits_0 \tag{14}$$

In the above equation, Σ<t|t−1 represents the covariance of the estimation value y<t|t−1 at the current moment, and Σ<t−1|t−1 represents a covariance of y<t−1|t−1 at the previous moment. From this, the estimation value of the current state is obtained, and an optimal estimation value y<t|t> of the current state may be obtained in conjunction with an observed value, which is expressed as follows:

$$y\langle t\mid t\rangle=y\langle t\mid t-1\rangle+K_G\cdot(x\langle t\rangle-C\cdot y\langle t\mid t-1\rangle) \tag{15}$$

$K_G$ in the optimal estimation value represents a gain coefficient, which reflects a credibility between the measured value and the calculated value. The gain coefficient is calculated as follows:

$$K_G=\frac{\sum\langle t\mid t-1\rangle\cdot C'}{C\cdot\sum\langle t\mid t-1\rangle\cdot C'+\sum_1} \tag{16}$$

In summary, the covariance of the current state is calculated as follows:

$$\sum\langle t\mid t\rangle=(E-K_G\cdot C)\cdot\sum\langle t\mid t-1\rangle \tag{17}$$

wherein E represents an identity matrix.

Another aspect of the present disclosure also proposes to establish a synchronization condition boundary model of a single microgrid, and accordingly establish a synchronization condition boundary model of multiple microgrids, to realize determination, before synchronization operation, regarding whether a distributed power supply regulated in the synchronization has spare capacity and whether a power flow distribution after the synchronization exceeds a limit.

Different from a high-voltage transmission network, the microgrid belongs to a low-voltage system, and its voltage value and frequency have a coupling relationship with both an active component and a reactive component, which makes the system unable to be completely split. For example, in some low-voltage microgrid systems, the voltage may be related to the active component and the frequency is related to the reactive component. In order to consider all three situations, the present disclosure establishes a functional relationship between the voltage value and frequency, and the active component and reactive component respectively:

$$\begin{cases}U_1=f(P_1,Q_1)\\ f_1=g(P_1,Q_1)\end{cases} \tag{18}$$

In a traditional power system, there is a concept of unit power regulation for a power generator, so a concept of droop coefficient is introduced in microgrids. The droop coefficient represents a gradient of the bus voltage value and frequency changing as the power. A relationship function considering the droop coefficient is as follows:

$$\begin{cases}U_1=f(P_1,Q_1,m_1)\\ f_1=g(P_1,Q_1,n_1)\end{cases} \tag{19}$$

The system capacity boundary conditions are as follows:

$$\begin{cases}-P_{1max}\le P_1\le P_{1max}\\ -Q_{1max}\le Q_1\le Q_{1max}\\ S_1\le S_{1max}\end{cases} \tag{20}$$

In the above equation, $U_1$ represents a bus voltage value of microgrid 1, $F_1$ represents a bus voltage frequency of microgrid 1, $P_1$ represents an active power that a voltage frequency support power supply of microgrid 1 can withstand, $Q_1$ represents a reactive power that the voltage frequency support power supply of microgrid 1 can withstand, Si represents an apparent power of the voltage frequency support power supply of microgrid 1, and its maximum value cannot exceed a maximum capacity of the distributed power supply. It must be noted that the following equation does not hold:

$$S_{max} \neq \sqrt{(P_{1max}^2 + Q_{1max}^2)} \quad (21)$$

Figure 16:
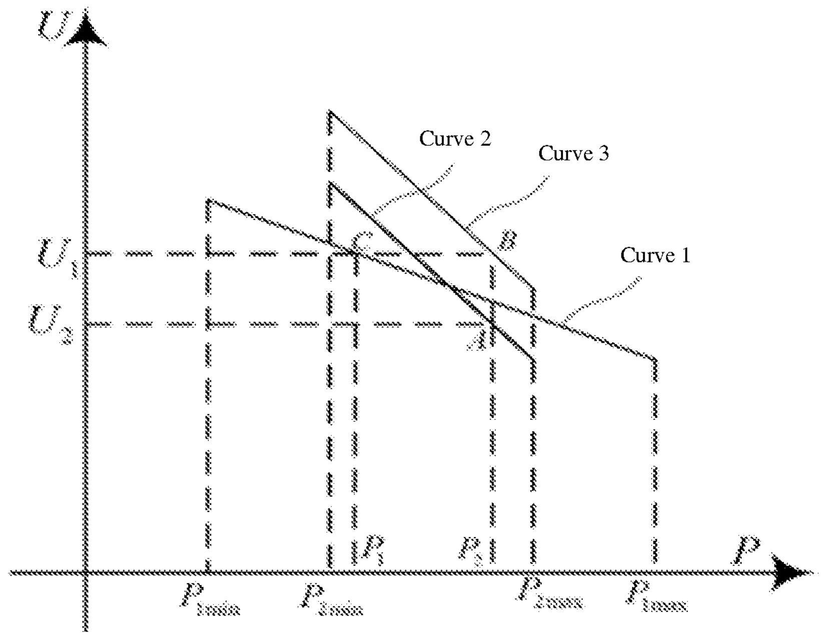
FIG. 16 is a voltage dynamic graph of active power regulation according to the present disclosure.

FIG. 16 is a voltage dynamic graph of active power regulation according to the present disclosure. Referring to FIG. 16, the frequency and voltage characteristics of the microgrid operating in island on both sides of the synchronization control point are shown. Herein, the following situation is considered: the voltage value in the low-voltage system and the microgrid system is linearly related to the active component, and the frequency is linearly related to the reactive component. In FIG. 16, curve 1 represents a relationship between an output power and a voltage value of microgrid 1, and curve 2 represents a relationship between an output power and a voltage value of microgrid 2. Under a condition that microgrid 1 operates at a point C, a corresponding system frequency is $U_1$; under a condition that microgrid 2 operates at a point A, a corresponding system frequency is $U_2$. As can be seen from the operating characteristics of the two microgrids, microgrid 1 corresponds to a larger capacity. For synchronization control, a microgrid with a smaller capacity may be used as an adjusted item for synchronization control, while a microgrid with a larger capacity may be used as a reference item for synchronization control. Therefore, the voltage value of microgrid 2 needs to be adjusted to $U_1$. From the change of a primary frequency modulation curve, it can be seen that an operating curve of microgrid 2 changes from the point A to a point B, and transforms from the curve 2 to a curve 3. Although the power does not change at this time, a transient impact power will occur at the moment when the two microgrid systems are connected in parallel, causing an instantaneous power increase. The power of microgrid 2 may exceed the maximum value at the moment of closing, causing synchronization failure. Therefore, performing synchronization operation at this voltage point causes a greater risk of failure, and this point may be used as a critical point.

The present disclosure selects a synchronization reference value based on the capacity of each microgrid in the microgrid group system, obtains an adjustment margin of each microgrid in the current operating state according to the functional relationship between voltage value and frequency and power, and determines a synchronization boundary condition for determining a synchronization frequency point, a voltage value point and a phase point. In addition, considering the impedance and inductive reactance of transmission lines in low-voltage systems, voltage is related to both active power and reactive power, and frequency is also related to active power and reactive power. The following corrections may be made based on experience values:

$$\begin{cases} U_1 = m_1 \cdot P_1 + a_1(Q_1)^2 + a_2 \cdot Q_1 + a_3 \\ f_1 = n_1 \cdot Q_1 + b_1(P_1)^2 + b_2 \cdot P_1 + b_3 \end{cases} \quad (22)$$

In the above equation, m represents a droop coefficient of the voltage value relative to the active component, and $a_1$, $a_2$, $a_3$ represent fitting relationship coefficients between the voltage value and the reactive component. $n_1$ represents a droop coefficient of the frequency relative to the reactive component, and $b_1$, $b_2$, $b_3$ represent fitting relationship coefficients between the frequency and the active component. These coefficients may be obtained through actual measurements and calculations. Corresponding curves of the droop coefficients of the two microgrids are obtained through calculations. Herein, only the analysis method of the voltage value characteristics is analyzed, and this method may also be used to analyze the frequency characteristics.

Figure 17:
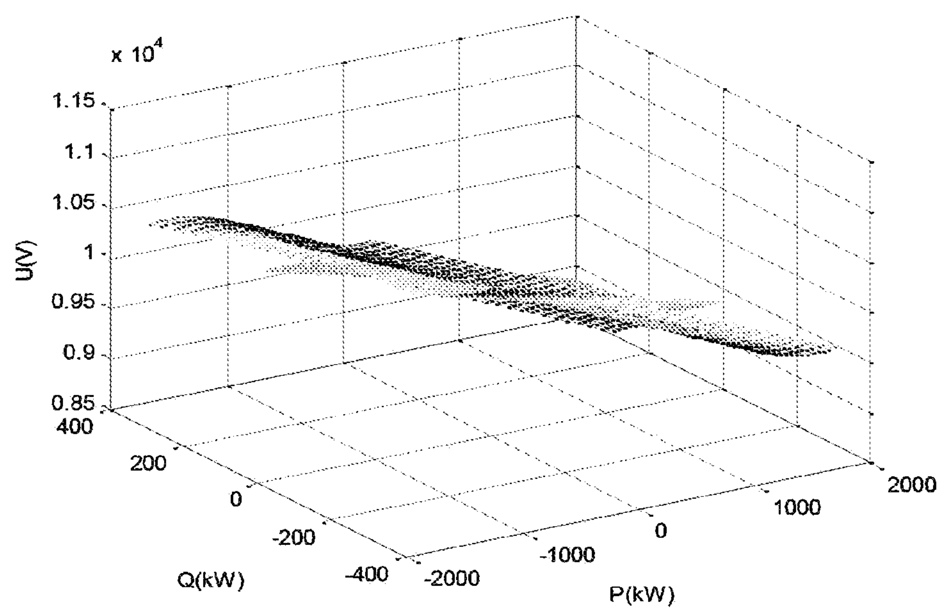
FIG. 17 is a graph of voltage as a function of active power and reactive power according to the present disclosure.
Figure 18:
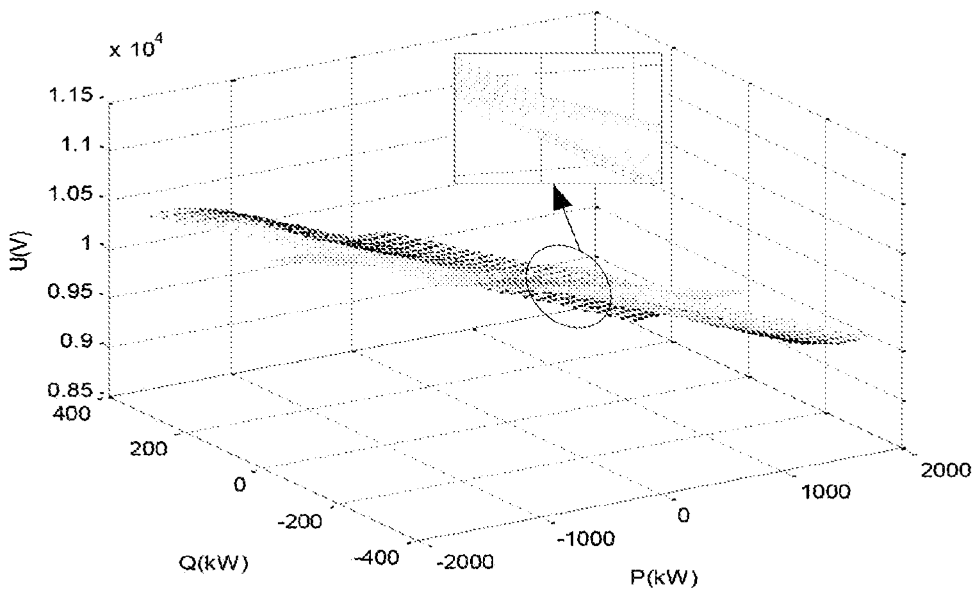
FIG. 18 is a graph of voltage as a function of active power and reactive power according to the present disclosure.
Figure 19:
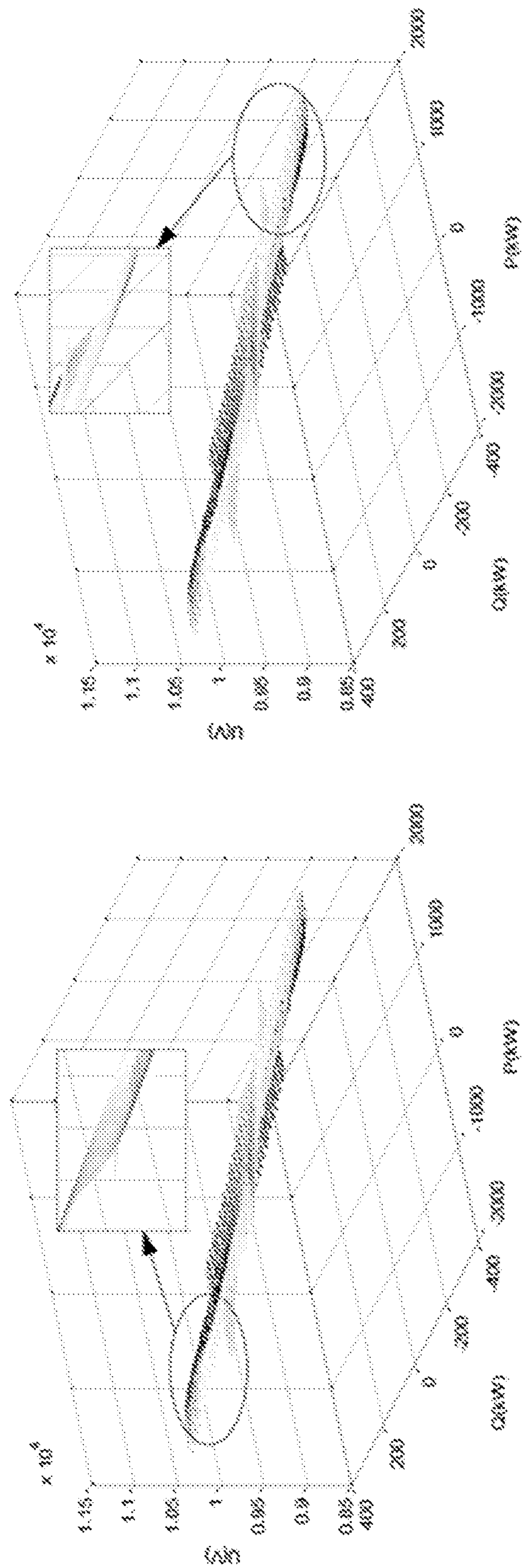
FIG. 19 is a graph of voltage as a function of active power and reactive power according to the present disclosure.

FIG. 17 is a graph of voltage as a function of active power and reactive power according to the present disclosure. FIG. 18 is a graph of voltage as a function of active power and reactive power according to the present disclosure. FIG. 19 is a graph of voltage as a function of active power and reactive power according to the present disclosure.

According to the aforementioned two-dimensional function curve, referring to FIG. 18, an optimal synchronization power area for system synchronization control is near an intersection area. If the two microgrids that will be closed and connected to the grid at the same time both operate in the intersection area, then a synchronization control instruction may be directly issued to a microgrid with a smaller capacity to make the microgrid follow a microgrid with a larger capacity. Referring to FIG. 19, a microgrid with a larger system capacity operates near a power limit (if energy storage is used as a main support power supply, there are two situations of absorbing and emitting maximum power points). Due to the instantaneous impact in the synchronization, the large-capacity microgrid may overcurrent, which may lead to synchronization failure, so it is not possible to directly control the synchronization of the small-capacity microgrid to follow the large-capacity microgrid. In this case, a synchronization controller is required to reasonably adjust the distributed power supply or an adjustable load of the large-capacity microgrid system. An operating point of the large-capacity microgrid is adjusted back to the intersection area to ensure a capacity margin of the two systems at the moment of synchronization to ensure the stability of the synchronization. Therefore, an adjustment sequence of multiple microgrids may be selected according to the capacity of each of the multiple microgrids, and a synchronization adjustment boundary of a microgrid that needs to be regulated is determined based on a margin in a current operating voltage parameter state. For example, a microgrid with a small capacity may be selected as a target to be regulated first in the synchronization, and the target to be regulated is changed under a condition that a voltage adjustment parameter exceeds the synchronization regulation boundary of the microgrid.

Figure 20:
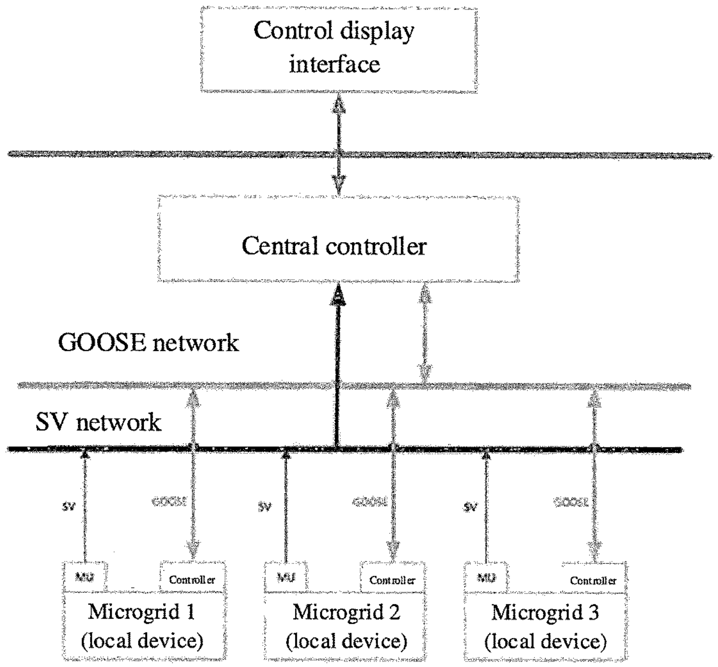
FIG. 20 is an architectural diagram of a synchronization control system using IEC 61850 communication according to the present disclosure.
Figure 21:
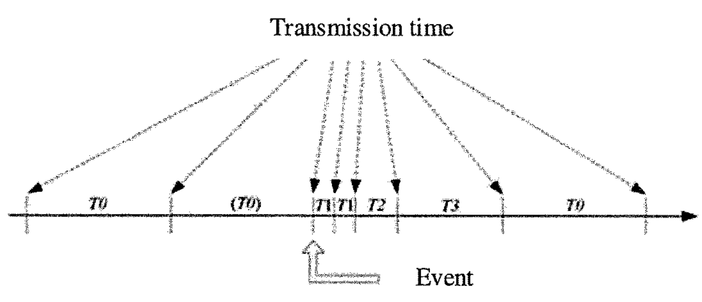
FIG. 21 is a schematic diagram of a process of sending GOOSE message according to the present disclosure.

FIG. 20 is an architectural diagram of a synchronization control system using IEC 61850 communication according to the present disclosure. FIG. 21 is a schematic diagram of a process of sending GOOSE message according to the present disclosure.

A control display interface in the system may be provided by a SCADA system and communicate with a central controller. SV (Sampled Value) and GOOSE (Generic Object Oriented Substation Events) in IEC 61850 are two communication protocols with relatively high real-time requirements in the IEC 61850 standard. The IEC 61850 communication method connects the central controller for the synchronization of the microgrid group with a measurement unit MU (local device) of each microgrid through the SV network and with a controller (local device) of each microgrid through the GOOSE network. The present disclosure uses the SV/GOOSE message format in the IEC 61850 communication method for data interaction to form a ring network architecture for Ethernet control and communication of high-speed communication. Using a ring network instead of a point-to-point communication architecture between the control center and microgrid equipment takes into account the complexity of system wiring and the real-time nature of data interaction between microgrids. The SV/GOOSE message under the IEC 61850 standard adopts the publisher/subscriber communication structure.

The SV/GOOSE message is a time-driven communication method, that is, sampling values are sent every predetermined time period. Under a condition that packet transmission is lost due to network reasons, the publisher (voltage and current sensors, switch quantities, status information, etc. in the microgrid local device) will not be affected and will continue to collect the latest voltage, current, and switch quantity status information, etc. The SV message is a time-driven communication method, sampling values may be sent at a predetermined time interval, and the predetermined time interval may be the same as a sampling time interval. For example, a voltage measurement value of a microgrid is sent in a time-driven manner per sampling period. The process of sending GOOSE message refers to FIG. 21, wherein TO is a heartbeat time, and a current state is sent every TO time period, so it is called a heartbeat message. If a data value of any member of the GOOSE data of each microgrid local device changes, all data will be sent, and then a second frame and a third frame will be sent at an interval of T1, a fourth frame will be sent at an interval of T2, and a fifth frame will be sent at an interval of T3, a sending time interval of subsequent messages gradually increases until a final message interval returns to the heartbeat time, that is, the sending time interval of a control instruction increases from the interval T1 to the heartbeat time interval TO. TO may be set to 5000 ms, T1 may be set to 2 ms, T2 may be set to 2 times T1, and T3 is set to 2 times T2.

Figure 22:
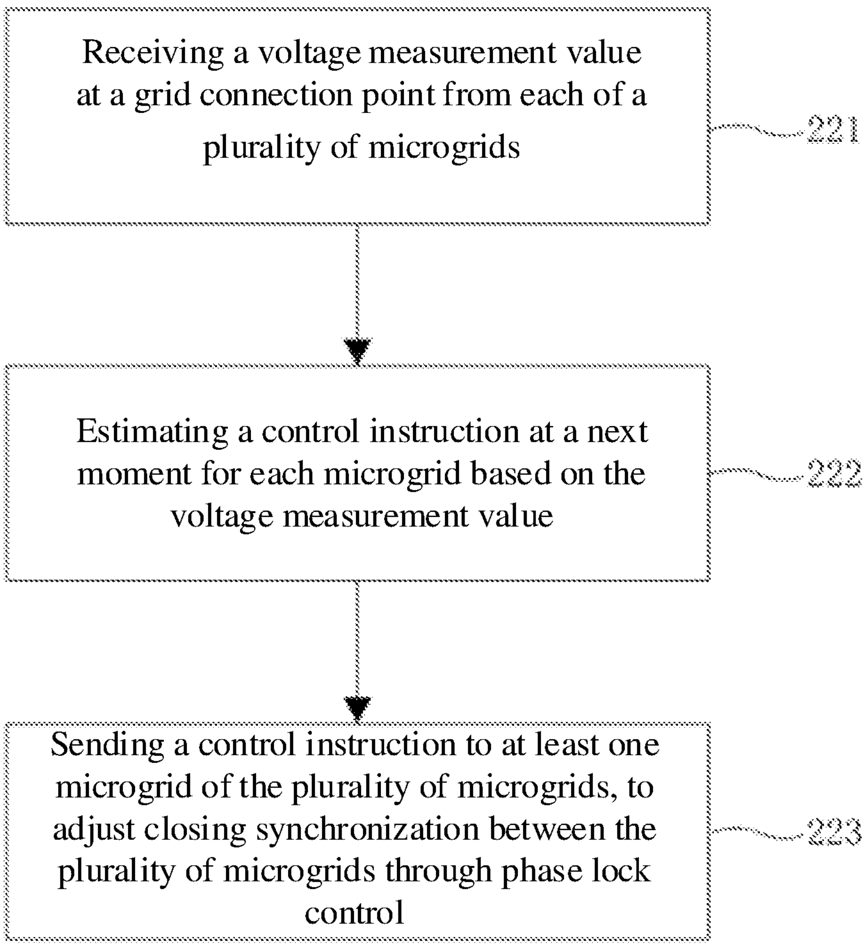
FIG. 22 is a flow chart of a synchronization control method for a microgrid group according to the present disclosure.

FIG. 22 is a flow chart of a synchronization control method for a microgrid group according to the present disclosure.

Referring to FIG. 22, in operation 221, the process is to receive a voltage measurement value at a grid connection point from each of a plurality of microgrids, wherein the voltage measurement value is sent in a time-driven manner per sampling period. In operation 222, the process is to estimate a control instruction at a next moment for each microgrid based on the voltage measurement value. Furthermore, in operation 223, the process is to send a control instruction to at least one microgrid of the plurality of microgrids, to adjust closing synchronization between the plurality of microgrids through phase lock control, wherein a sending time interval of the control instruction is increased from a minimum time interval to a heartbeat time interval.

The present disclosure also provides a computer-readable storage medium storing a computer program. The computer-readable storage medium stores a computer program that, when executed by a processor, causes the processor to perform the synchronization control method for a microgrid group according to the present disclosure. The computer-readable recording medium is any data storage device that can store data read by a computer system. Examples of the computer-readable recording medium include: a read-only memory, a random-access memory, a read-only optical disk, a magnetic tape, a floppy disk, an optical data storage device, and a carrier wave (such as data transmission over the Internet via a wired or wireless transmission path).

The present disclosure also provides a computer device. The computer device includes a processor and a memory. The memory is configured to store a computer program. The computer program is executed by the processor so that the processor performs the synchronization control method for a microgrid group according to the present disclosure.

In the present disclosure, the SV and GOOSE communication methods of IEC 61850 are used to sample the voltage in real time and send a control instruction, and a high-precision phase-locked loop is used to calculate the amplitude, frequency and phase of the voltage. In a microgrid group with multiple synchronization control points, the accuracy and timeliness of the collected data and the effectiveness of the control can still be guaranteed.

In the microgrid group system running a large number of power electronic equipment, more accurate and faster proportional-integral adjustment is used to control the power of the distributed power supply inside the microgrid, which not only reduces the difficulty of adjustment but also further ensures the accuracy of the synchronization determination.

For problems such as errors and delays in sensor measurement or signal transmission, an optimal estimation model is used to estimate an optimal value of a state quantity of the synchronization control to ensure that the synchronization control instruction is closest to an actual operating condition of the system, which greatly improves a success rate of synchronization closing of the microgrid group.

For the synchronization control of multiple microgrids, a synchronization condition boundary model of multiple microgrids is established to accurately determine the synchronization boundary condition of each microgrid in the microgrid group, thereby achieving system stability and rapid synchronization closing, and improving synchronization efficiency.

Although the present disclosure includes specific examples, it will be apparent to those of ordinary skill in the art that various changes in form and detail may be made in these examples without departing from the spirit and scope of the claims and their equivalents. The examples described herein are to be considered in a descriptive sense only and not for purposes of limitation. Descriptions of features or aspects in each example are to be considered as applicable to similar features or aspects in other examples. If the described techniques are performed in a different order, and/or if components of the described systems, architectures, apparatuses, or circuits are combined in a different manner and/or the components of the described systems, architectures, apparatuses, or circuits are replaced or supplemented by other components or their equivalents, then appropriate results can be obtained. Therefore, the scope of the present disclosure is defined not by the detailed description but by the claims and their equivalents, and all modifications within the scope of the claims and their equivalents will be construed as being included in the present disclosure.

What is claimed is:

1. A synchronization control system for a microgrid group, wherein the microgrid group comprises a plurality of microgrids, the system comprises a central controller, and the central controller is configured to:

receive a voltage measurement value at a grid connection point from each of the plurality of microgrids;

perform proportional-integral adjustment on the voltage measurement value to obtain a difference between the voltage measurement value at a previous moment and a control value at a current moment, so as to estimate a control instruction at a next moment for each microgrid; and send a control instruction to at least one microgrid of the plurality of microgrids, to adjust closing synchronization between the plurality of microgrids through phase lock control, wherein the central controller is further configured to:

perform optimal state estimation on the voltage measurement value on both sides of the grid connection point, so as to minimize an error of the control instruction.

2. The system according to claim 1, wherein the voltage measurement value is sent in a time-driven manner per sampling period; and wherein a sending time interval of the control instruction is increased from a minimum time interval to a heartbeat time interval.

3. The system according to claim 2, wherein the central controller is further configured to:

receive the voltage measurement value from each microgrid through a SV protocol in an IEC 61850 standard; and send the control instruction to the at least one microgrid through a GOOSE protocol in the IEC 61850 standard, and perform individual verification for each frame of data transmitted via the SV/GOOSE protocol.

4. The system according to claim 1, wherein the central controller is further configured to:

determine that a measurement error accumulation obtained by accumulating and summing the differences follows a Gaussian distribution.

5. The system according to claim 4, wherein the central controller is further configured to:

perform real-time verification of each voltage measurement value using a covariance of the voltage measurement value of a previous voltage cycle.

6. The system according to claim 1, wherein the central controller is further configured to:

obtain a direct-axis component and a quadrature-axis component of a discrete voltage value by performing a Park transformation on the voltage measurement value into a rotating Cartesian coordinate system and performing an orthogonal transformation, to serve as an input value for proportional-integral adjustment.

7. The system according to claim 1, wherein the central controller is further configured to:

determine an adjustment sequence of the plurality of microgrids based on a capacity of each of the plurality of microgrids, and determine, based on a margin in a current operating voltage parameter state, a synchronization regulation boundary of a microgrid that needs to be regulated.

8. The system according to claim 7, wherein the central controller is further configured to:

select a microgrid with a small capacity as a target to be regulated first in a synchronization, and change the target to be regulated under a condition that a voltage adjustment parameter exceeds the synchronization regulation boundary of the microgrid.

9. A synchronization control method for a microgrid group, wherein the microgrid group comprises a plurality of microgrids, and the method comprises:

receiving a voltage measurement value at a grid connection point from each of the plurality of microgrids;

performing proportional-integral adjustment on the voltage measurement value to obtain a difference between the voltage measurement value at a previous moment and a control value at a current moment, so as to estimate a control instruction for a next moment; and sending a control instruction to at least one microgrid of the plurality of microgrids, to adjust closing synchronization between the plurality of microgrids through phase lock control, wherein the method further comprises:

performing optimal state estimation on the voltage measurement value on both sides of the grid connection point, so as to minimize an error of the control instruction.

10. The method according to claim 9, wherein the voltage measurement value is sent in a time-driven manner per sampling period; and wherein a sending time interval of the control instruction is increased from a minimum time interval to a heartbeat time interval.

11. The method according to claim 10, wherein the method further comprises:

receiving the voltage measurement value from each microgrid through a SV protocol in an IEC 61850 standard, and sending the control instruction to the at least one microgrid through a GOOSE protocol in the IEC 61850 standard; and performing individual verification for each frame of data transmitted via the SV/GOOSE protocol.

12. The method according to claim 9, wherein the method further comprises:

determining that a measurement error accumulation obtained by accumulating and summing the differences follows a Gaussian distribution.

13. The method according to claim 12, wherein the method further comprises:

performing real-time verification of each voltage measurement value using a covariance of the voltage measurement value of a previous voltage cycle.

14. The method according to claim 9, wherein the method further comprises:

obtaining a direct-axis component and a quadrature-axis component of a discrete voltage value by performing a Park transformation on the voltage measurement value into a rotating Cartesian coordinate system and performing an orthogonal transformation, to serve as an input value for proportional-integral adjustment.

15. The method according to claim 9, wherein the method further comprises:

selecting an adjustment sequence of the plurality of microgrids based on a capacity of each of the plurality of microgrids, and determine, based on a margin in a current operating voltage parameter state, a synchronization regulation boundary of a microgrid that needs to be regulated.

16. The method according to claim 15, wherein the method further comprises:

selecting a microgrid with a small capacity as a target to be regulated first in a synchronization, and change the target to be regulated under a condition that a voltage adjustment parameter exceeds the synchronization regulation boundary of the microgrid.

17. A non-transitory computer readable storage medium having stored thereon computer programs that, when executed by a processor, implement the synchronization control method for a microgrid group according to claim 9.

18. A computing device, comprising:

a processor;

a memory storing computer programs that, when executed by the processor, implement the synchronization control method for a microgrid group according to claim 9.

* * * * *